(12) United States Patent
Nastronero

(10) Patent No.: US 6,198,425 B1
(45) Date of Patent: Mar. 6, 2001

(54) PULSE DOPPLER TARGET DETECTING DEVICE

(75) Inventor: John J. Nastronero, Corona, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 05/014,833

(22) Filed: Feb. 16, 1970

(51) Int. Cl.[7] ............................. F42C 13/04; G01S 13/56
(52) U.S. Cl. ................................... 342/68; 102/214
(58) Field of Search ..................... 343/7 PF, 5 PD; 102/70.2 P; 342/27, 28, 68, 16, 17, 18, 19, 159, 160, 161, 162

(56) References Cited

U.S. PATENT DOCUMENTS

| 3,732,564 | * | 5/1973 | Kuck et al. | 102/214 |
|---|---|---|---|---|
| 3,745,573 | * | 7/1973 | Dick | 342/68 |
| 3,781,884 | * | 12/1973 | Horton | 102/214 |
| 3,802,343 | * | 4/1974 | Dahl | 102/214 |
| 3,836,963 | * | 9/1974 | Arsem et al. | 342/68 |
| 3,849,778 | * | 11/1974 | Redcay | 342/68 |
| 3,872,792 | * | 3/1975 | Goldberg et al. | 102/214 |
| 3,877,377 | * | 4/1975 | Rabinow | 102/214 |
| 3,945,008 | * | 3/1976 | Schmucker | 342/68 |
| 3,994,229 | * | 11/1976 | Flowers | 102/214 |
| 4,096,480 | * | 6/1978 | Miner et al. | 342/68 |
| 4,108,075 | * | 8/1978 | Hinman, Jr. et al. | 102/214 |
| 4,139,849 | * | 2/1979 | Tedder | 342/68 |
| 4,192,235 | * | 3/1980 | Jacomini | 102/214 |
| 4,193,072 | * | 3/1980 | McKusick | 342/53 |
| 4,194,202 | * | 3/1980 | Doyle | 102/214 |
| 4,194,203 | * | 3/1980 | Kuck | 342/16 |
| 4,196,433 | * | 4/1980 | Brown | 342/61 |
| 4,203,366 | * | 5/1980 | Wilkes | 102/214 |

* cited by examiner

Primary Examiner—John B. Sotomayor
(74) Attorney, Agent, or Firm—Harvey Fendelman; Michael A. Kagan; T. M. Phillips

(57) ABSTRACT

A target detection device of the electromagnetic transmitter-receiver reaction type comprising a radio frequency oscillator which is integral with its radiating system and detector. It incorporates a pulse modulator which drives the oscillator to periods of high power transmission and a signal processing system to reject unwanted data and to effect detonation of the warhead at the optimum point on its trajectory.

8 Claims, 9 Drawing Sheets

PULSE DOPPLER TARGET DETECTING DEVICE

The invention herein described may be manufactured and used by or for the Government of the United States of America for governmental purposes without the payment of any royalties thereon or therefor.

BACKGROUND OF THE INVENTION

1. Field of the Invention

This invention relates to an electronic target detecting device (TDD) and more particularly to a reaction-type pulse Doppler TDD.

2. Description of the Prior Art

Electronic proximity TDD's for explosive missiles usually comprise a miniature radio frequency transmitter-receiver of the radiating-detector type which emits continuous radio frequency waves from an antenna carried by the missile, or a separate radio frequency oscillator and detector coupled to the antenna. As the missile approaches the target, some of the TDD radiation is reflected by the target and received by the TDD through the antenna in a continuously varying phase relationship to that transmitted. The effect of this changing phase difference on the radiating-detector or the diode detector of the radio frequency oscillator and diode detector combination is the generation of an audio frequency voltage in the transmitter-receiver. This voltage is of Doppler frequency and is amplified by a selective audio frequency amplifier of the TDD to initiate a firing circuit when the amplitude and frequency of the reflected radiation reaches a predetermined level at a desired distance from missile to target. The firing circuit in turn functions an electric squib in its circuit to cause detonation of the explosive payload.

TDD's of the above described type are susceptibly to jamming, particularly to repeater method of jamming in which some of the r-f energy radiated by the fuze is picked up by a receiving antenna, greatly amplified and reradiated. The phase of this reradiated signal compared to that of the original signal radiated by the TDD varies with the distance from TDD to repeater and this gives rise to a Doppler shift of the jamming signal frequency, which usually will result in near optimum TDD amplifier response.

SUMMARY OF THE INVENTION

The present invention provides a target detecting device (TDD) of the electromagnetic transmitter-receiver reaction type, which will provide high peak power, high oscillator sensitivity, absolute range cut-off, non-coherent transmission, and absence of mutual coupling. The system embodying the invention includes a radio frequency oscillator which is integral with its radiating system detector and incorporates a pulse modulator which drives the oscillator to periods of high power transmission. Means are provided to reject countermeasure signals and to generate a detonation signal at the optimum point on the missile's trajectory.

An object of the invention is a radio powered TDD using a c-w oscillator which is periodically plate-pulsed to a high level of oscillation.

Another object of the invention is a radio powered proximity TDD using a c-w oscillator which is periodically plate-pulsed to a high level power output accompanied by a frequency shift.

Another object of the invention is an electronic proximity TDD of superior countermeasure features.

BRIEF DESCRIPTION OF THE DRAWING

Other objects and many of the attendant advantages of this invention will become readily appreciated as the same becomes better understood by reference to the following detailed description when considered in connection with the accompanying drawings wherein:

Referring to FIG. 1 there is shown in block diagram form a pulse-modulated Doppler TDD housed in a housing 10 that is affixed to the nose of an explosive missile 12, (FIG. 2). A low-level c-w oscillator 14 for producing continuous waves that are fed to a transmitting and receiving dipole antenna 16, has coupled to it a blocking oscillator 15. Blocking oscillator 15 provides periodically signals to c-w oscillator 14 to cause its output to rise to a maximum value accompanied by a frequency shift in a manner to be described below. Energy reflected from a target (not shown) is fed from antenna 16 to detector 18 where it is detected and provides an audio output that is amplified in audio amplifier and fed as a trigger signal to thyratron 22. When thyratron 22 fires, a signal is fed to squib 24 which explodes booster charge 26 to detonate the main explosive charge 28 of the missile 12 (FIG. 2).

Figure 1:
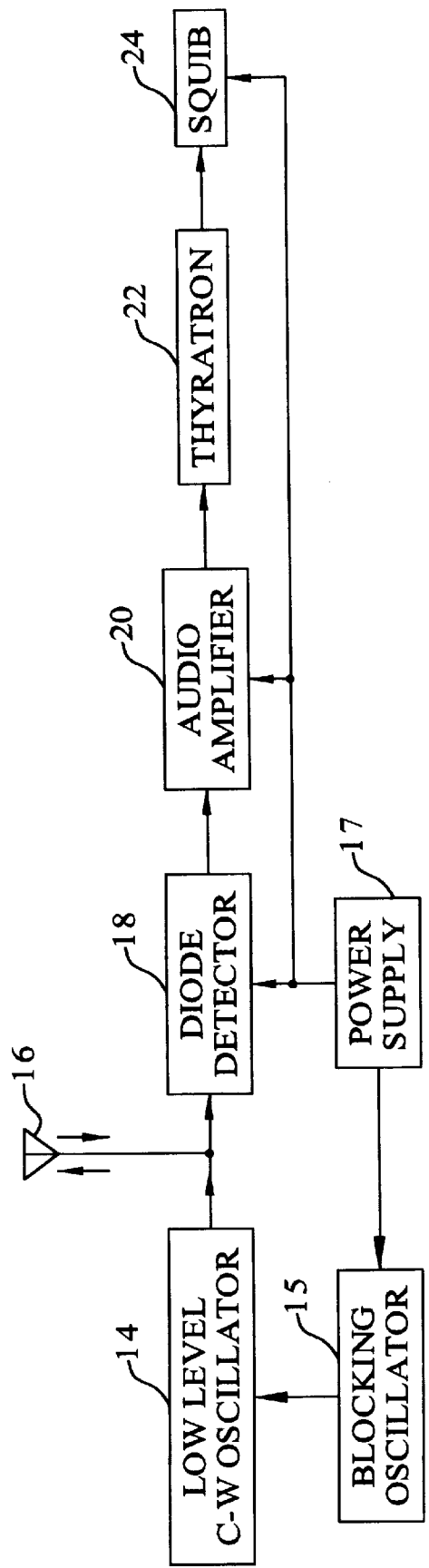
FIG. 1 is a block diagram of a preferred embodiment of the invention.
Figure 2:
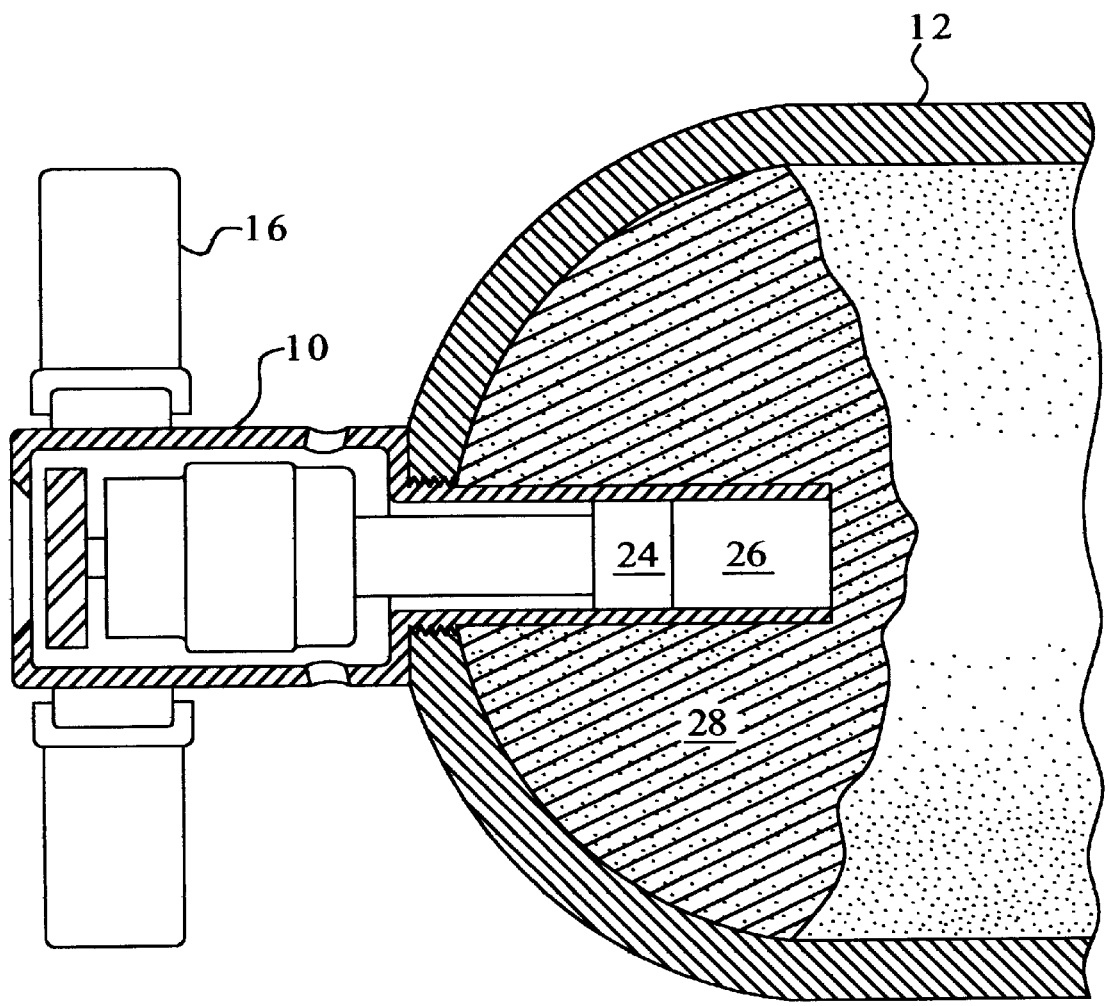
FIG. 2 is a fragmentary cross-sectional view of a missile employing the TDD of the invention.
Figure 3:
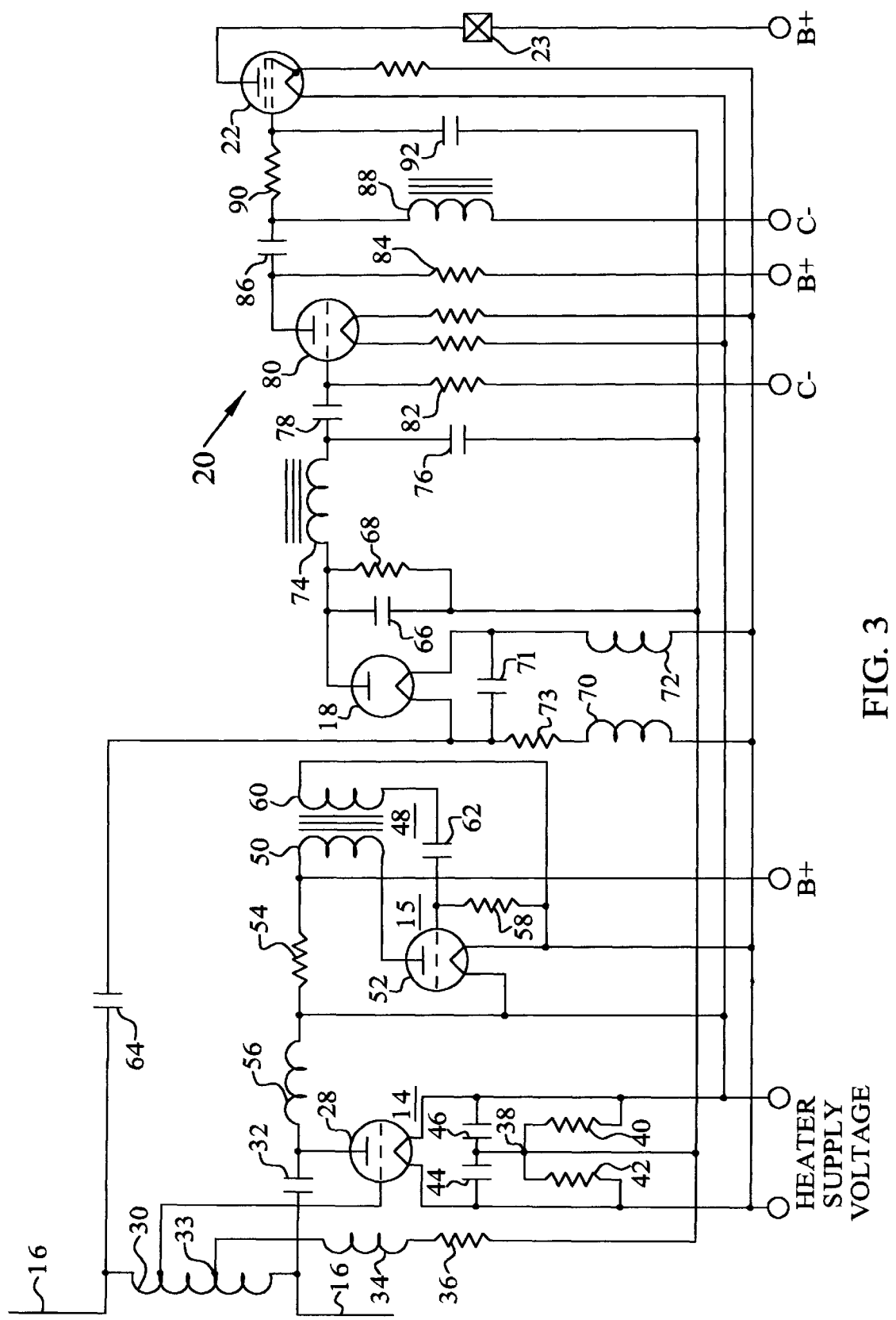
FIG. 3 is a schematic diagram of the embodiment of FIG. 1.

Referring to the schematic diagram of FIG. 3, low level c-w oscillator 14 comprises a triode 28 having an oscillator coil 30 connecting its grid and plate through a blocking capacitor 32. Dipole antenna 16 is connected to coil 30 in a conventional manner. The center tap 33 of coil 30 is connected through a radio frequency choke 34 in series with the bias-producing resistor 36 to the cathode center tap 38 of triode 28, formed by resistors 40, 42. Capacitors 44, 46 are cathode by-pass capacitors.

Blocking oscillator 15 is connected in series with low-level c-w oscillator 14 and the B+ power supply 17. Blocking oscillator transformer 48 has one terminal of its winding 50 connected to the plate of triode 52 and the other terminal to B+ supply and through resistor 54 and choke 56 to the anode of triode 28. The grid of triode 52 is connected to the cathode of triode 52 through resistor 58 and to one terminal of winding 60 of transformer 48 through capacitor 62. Resistor 58 and capacitor 62 form the time constant of blocking oscillator 15.

Diode detector 18 has its cathode coupled through capacitor 64 to dipole antenna 16. It is obvious that as the missile carrying the TDD approaches a target, a Doppler frequency will appear in antenna 16 which is utilized to function the remainder of the circuitry, including audio frequency amplifier 20 and thyratron 22.

Capacitor 66 and resistor 68 are connected across the plate circuit of detector 18 to form an integrating circuit which partially separates the Doppler frequency from the frequencies of low-level c-w oscillator 14 and blocking oscillator 15. Choke coils 70, 72, capacitor 71 and resistor 73 are provided to further isolate the r-f energy.

The output of diode detector 18, containing the Doppler frequency, is fed directly to audio frequency resonant boost circuit 74, 76 which should be designed to pass the desired Doppler frequency. The passed signal is fed through coupling capacitor 78 to the grid of triode 80. Resistor 82 serves as a grid bias resistor, while resistor 84 serves as a plate supply for triode 80. A high-pass filter to take out frequencies below the desired Doppler frequency is provided by means of capacitor 86 and choke 88 series connected across the output triode 80. Resistor 90 and capacitor 92 form a low-pass filter to take out frequencies above the desired Doppler frequency.

Capacitor 86 also serves as a coupling capacitor to couple the amplified Doppler frequency signal from detector 18 to the grid of thyratron 22. When a signal of adequate amplitude is received from detector 18, thyratron 22 will fire causing a flow of current to actuate squib 23 in its plate circuit.

Figure 5:
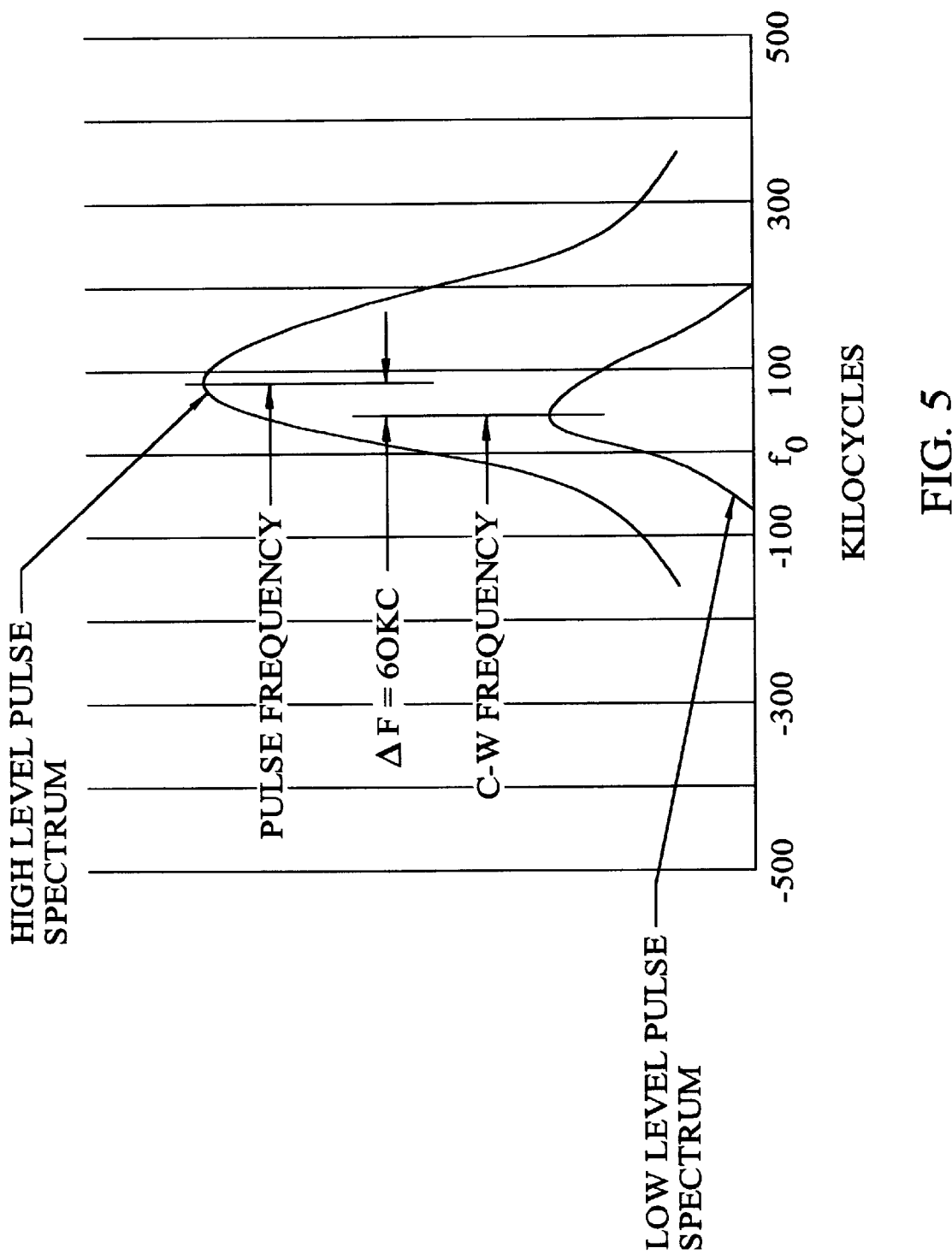
FIG. 5 is a graph showing the frequency spread of the c-w and pulsed r-f.

The pulse-modulated Doppler TDD described above utilizes a low-level c-w oscillator 14 which is periodically plate-pulsed to a high level of oscillation by blocking oscillator 15. The power level during pulses is approximately 20 db higher than during c-w operation. This change in power is accompanied by a shift in the frequency of the output of low-level c-w oscillator 14 of about 60 KC, as shown in the graph of FIG. 5. The transition is continuous, with the low level c-w oscillator 14 frequency and power level shifting from low level c-w condition as the plate pulse increases in amplitude. The presence of c-w operation between pulses has a stabilizing effect on the build-up time of oscillations during pulses and eliminates the highly-sensitive super-regenerative region characteristic of TDD's that radiate only during the pulse periods.

Figure 4:
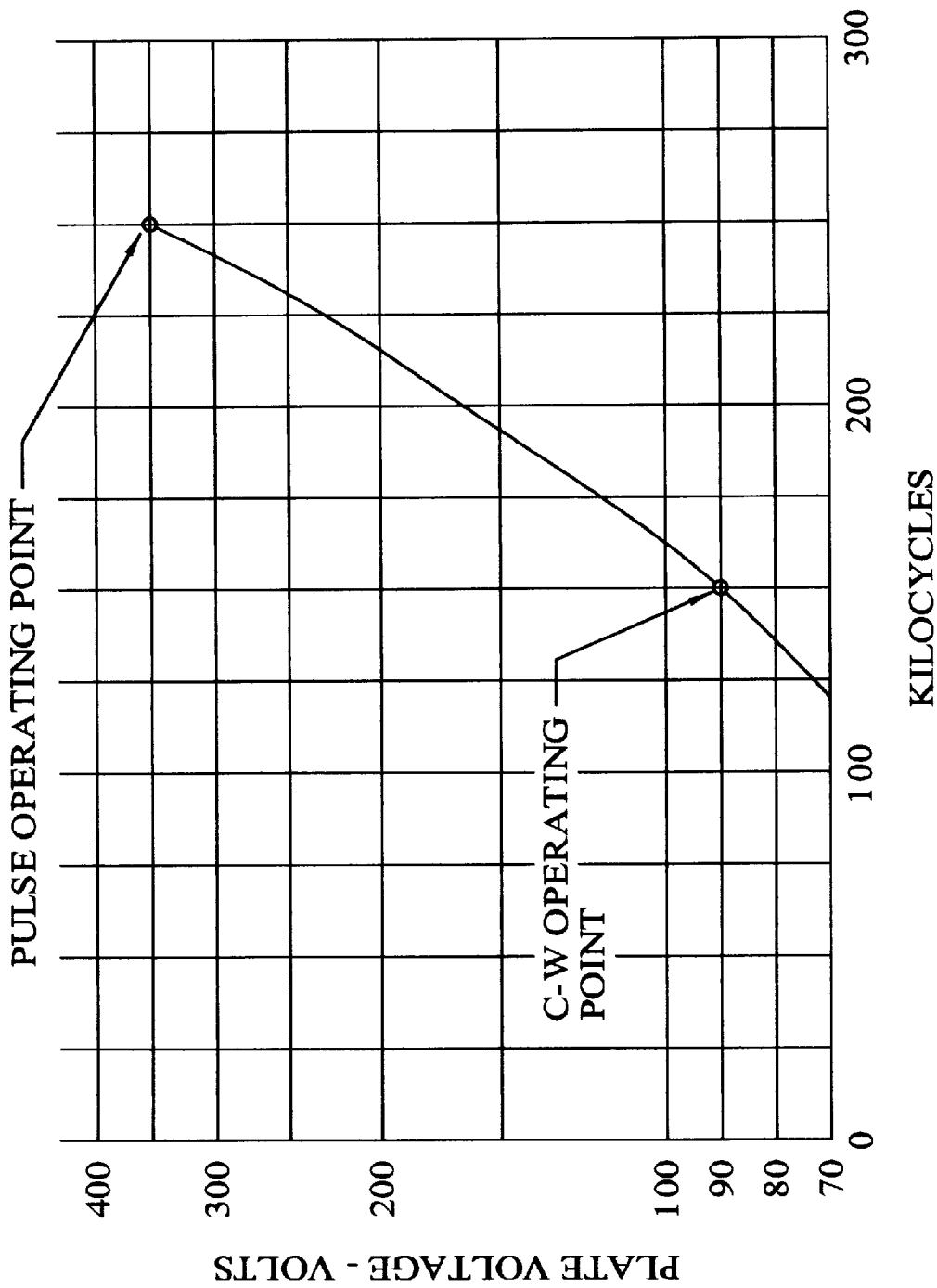
FIG. 4 is a graph illustrating the oscillator plate voltage-frequency characteristics.

The TDD differs from conventional pulse schemes, primarily in the application of sharp intermittent positive pulses to the low-level c-w oscillator 14. The blocking oscillator 15 in series with the B+ supply voltage provides the gating action which produces the positive pulses applied to the plate of the low-level c-w oscillator 14. During the blocked period the low level c-w oscillator 14 operates at a low level because of the presence of the dropping resistor 54. During the pulse period, the supply voltage divides almost equally between the low level c-w oscillator 14 and blocking oscillator 15. As can be best seen by reference to FIG. 4, when the supply voltage is 600 volts, the low level c-w oscillator 14 plate voltage is approximately 90 volts during the non-pulse period and increases to approximately 350 volts during the pulse period, with the accompanying frequency shift of 60 kc.

The pulse repetition rate and duration are controlled primarily by the time constant formed by the elements 58 and 62 in the grid circuit of the blocking oscillator 15 and are not appreciably affected by jamming fields, changes in the low level c-w oscillator 14 loading do reflect some changes in loading on blocking oscillator 15 and result in a corresponding change in pulse frequency, but this effect is not critical. Since the TDD is essentially a constant current device blocking oscillator 15 plate plate voltage at the start of pulsing is constant and equal to the IR drop across the resistor 54. Because of this constancy of blocking oscillator plate voltage at the start of pulsing, the repetition rate is largely unaffected by the jamming field. Because of the low level oscillations between pulses, the buildup of oscillations follows the applied pulse with no apparent delay and is not effected by extraneous fields.

Since the TDD operates at a low c-w level during normal off time, a repeater type of jammer may be able to amplify the c-w signal sufficiently to jam the TDD. The additional gain requirements and the large continuous output that the repeater must be capable of producing makes the repeater highly impractical. In the present embodiment a satisfactory operation was found when the low level c-w oscillator 14 of the TDD radiates about 15–20 mw during low level oscillation time. The peak radiated power of 1.8 watts is obtained during pulsing, the ratio of the two powers being approximately 100, or 20 db. A repeater jammer will amplify the c-w signal, which is 20 db down in power and 60 kc removed from the pulse frequency. In order to be effective against the pulse output from oscillator 14 the repeater jammer must produce a field sufficiently large to lock-in the pulse oscillations. Calculations indicate a field on the order of 6 volts per meter to produce the lock-in, which field must be produced by amplification of the low level c-w output from the TDD. A repeater jammer with. these characteristics is impractical.

Figure 6:
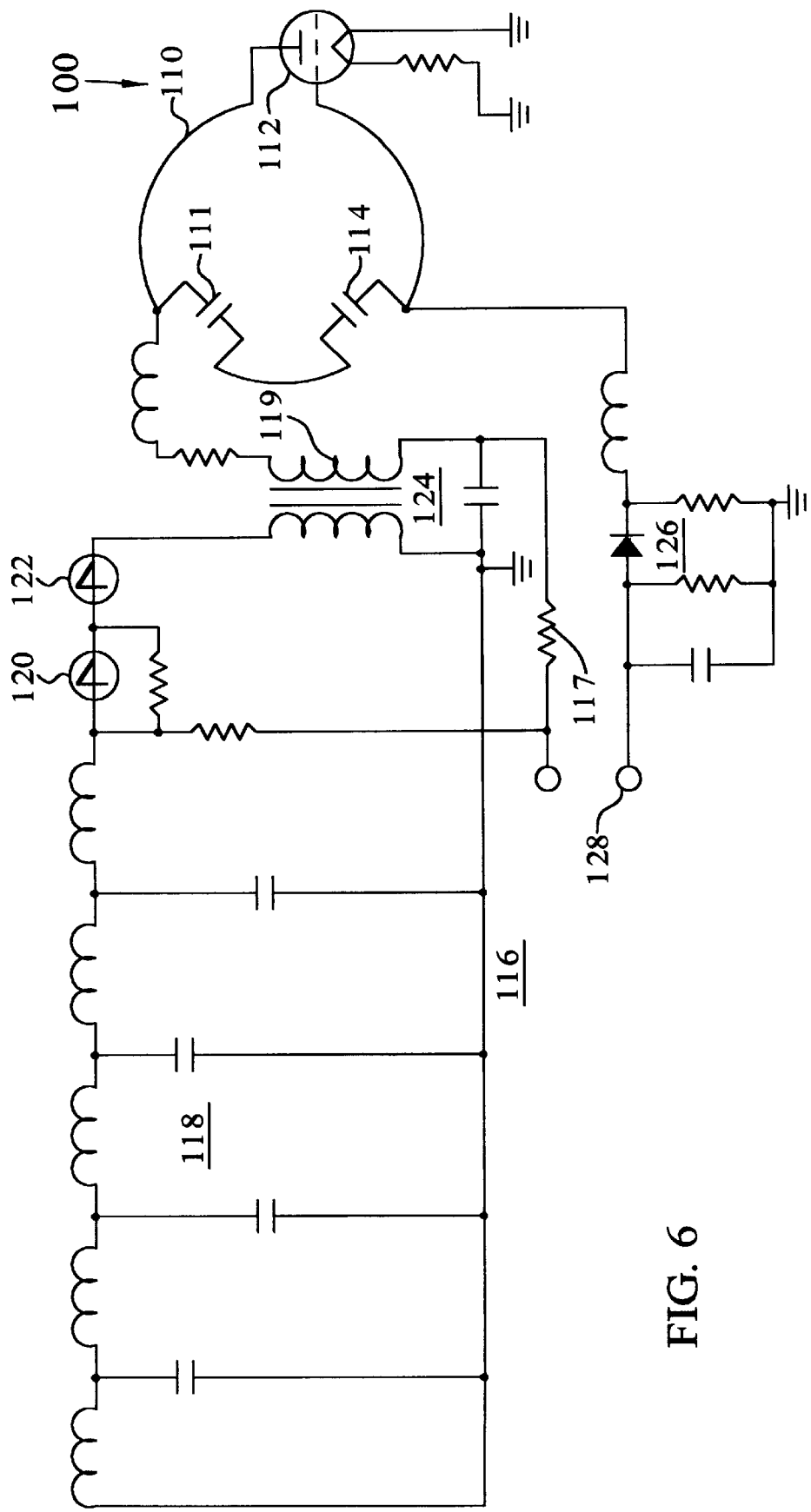
FIG. 6 is the schematic of an embodiment of the invention using a loop antenna.

In FIG. 6 the oscillator 100 consists of a modified Colpitts circuit operating in a pulsed mode, using reactance grid detection. Antenna 110 consists of a three-gap loop. The three sections are coupled by capacitors 111 and 114 and the antenna is connected across the plate and grid of oscillator tube 112. Loop 110 acts as the high-Q resonant circuit for oscillator 100 as well as the transmitting and receiving antenna. The oscillator 100 is plate-pulsed by means of pulses supplied pulse modulator 116. Pulse modulator 116 consists of a charging network 118 and switching diodes 120, 122, and pulse transformer 124. With the values shown, 250 V pulses at a rate of 20 to 40 kHz have been found satisfactory. Low-level c-w oscillation is provided by applying a low voltage to the plate of tube 112 through resistor 117 and pulse transformer winding 119. Detection of the doppler signal is accomplished by diode detector network 126. The detected signal appearing at output terminal 128 is processed in the same manner as the detected signal out of diode detector 18 of FIG. 3.

Figure 7:
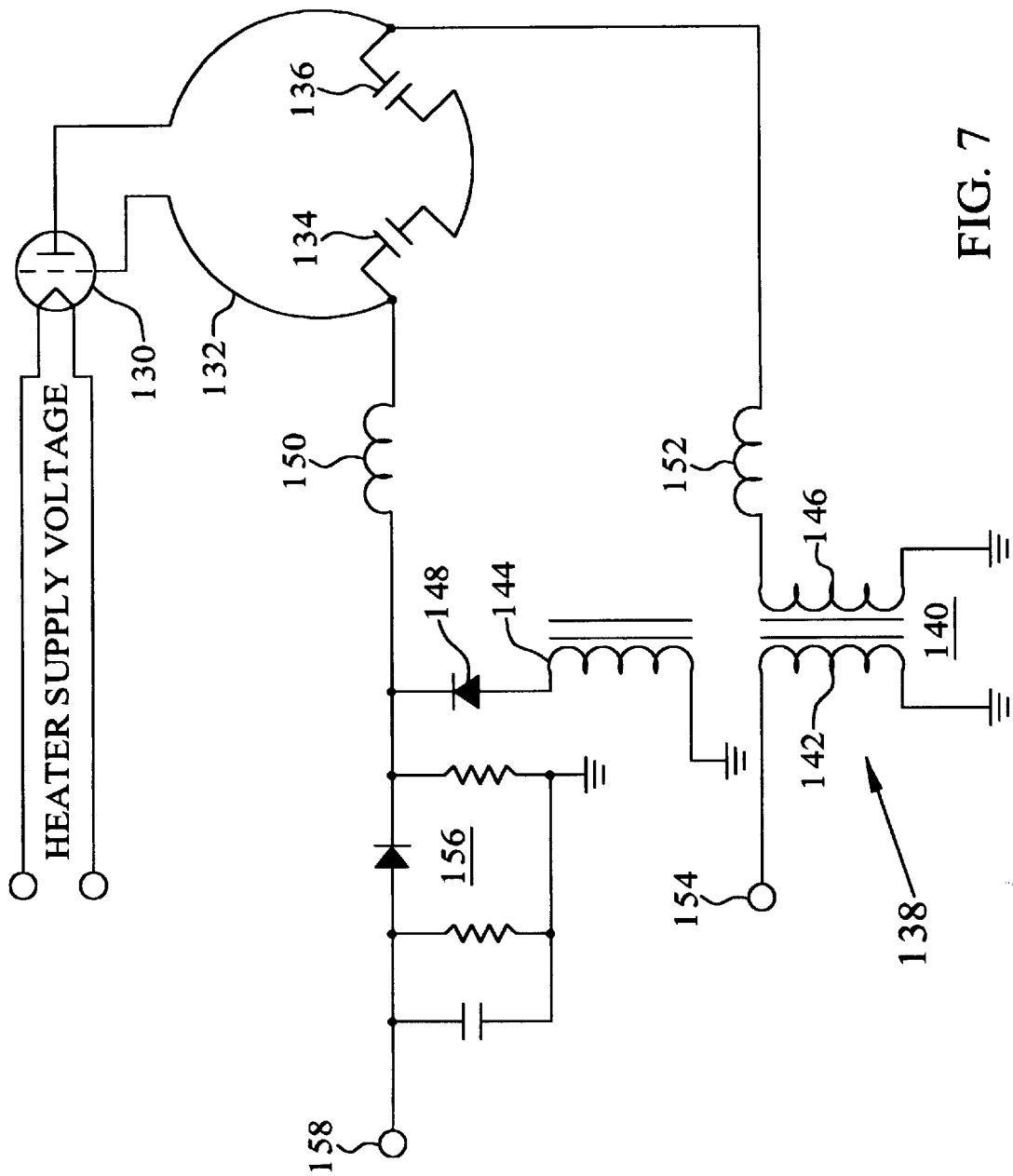
FIG. 7 is the schematic of an alternate form of oscillator which eliminates the need for the c-w stabilization.
Figure 7A:
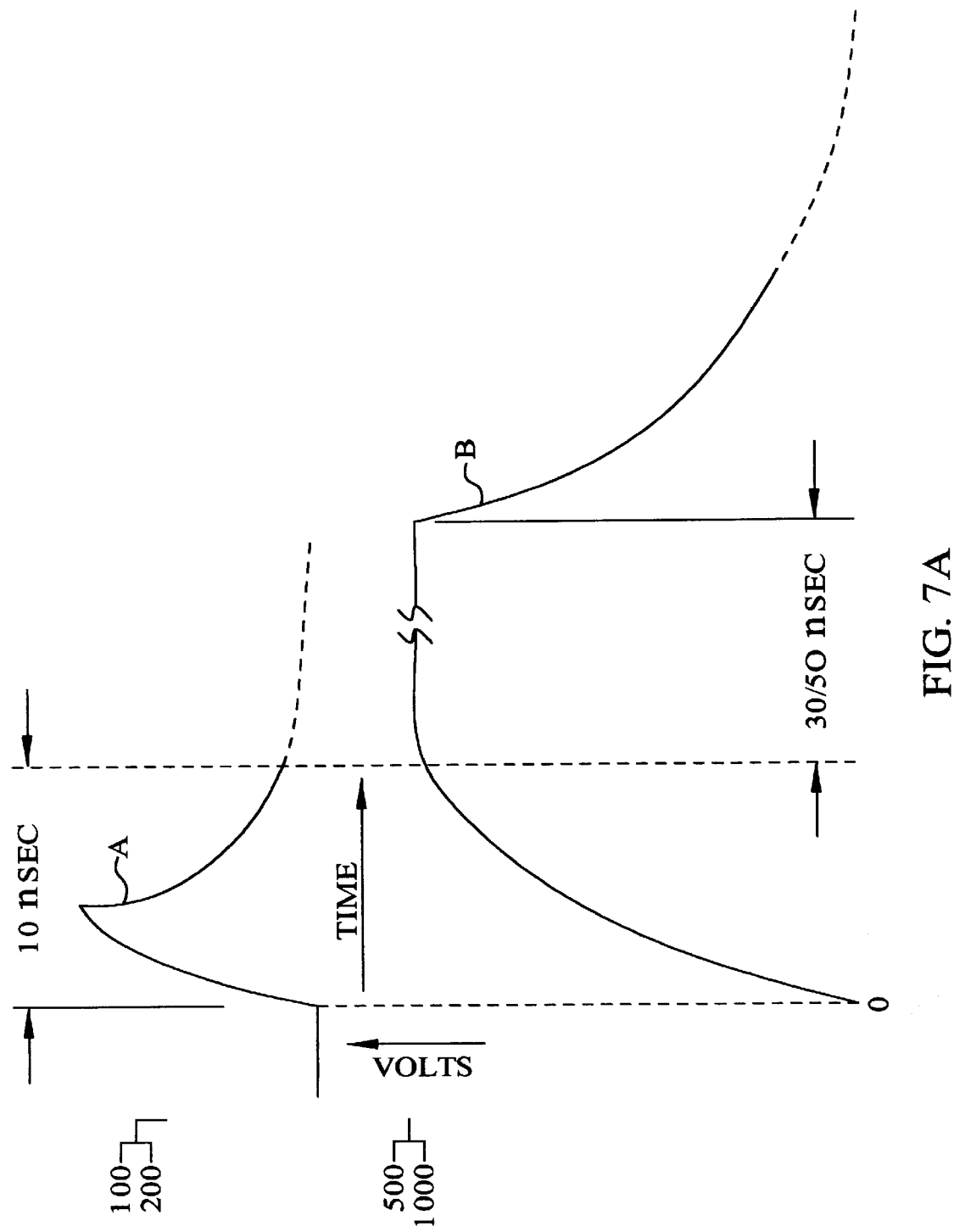
FIG. 7A is a graph of waveforms used in describing the operation of the circuit of FIG. 7.
Figure 8:
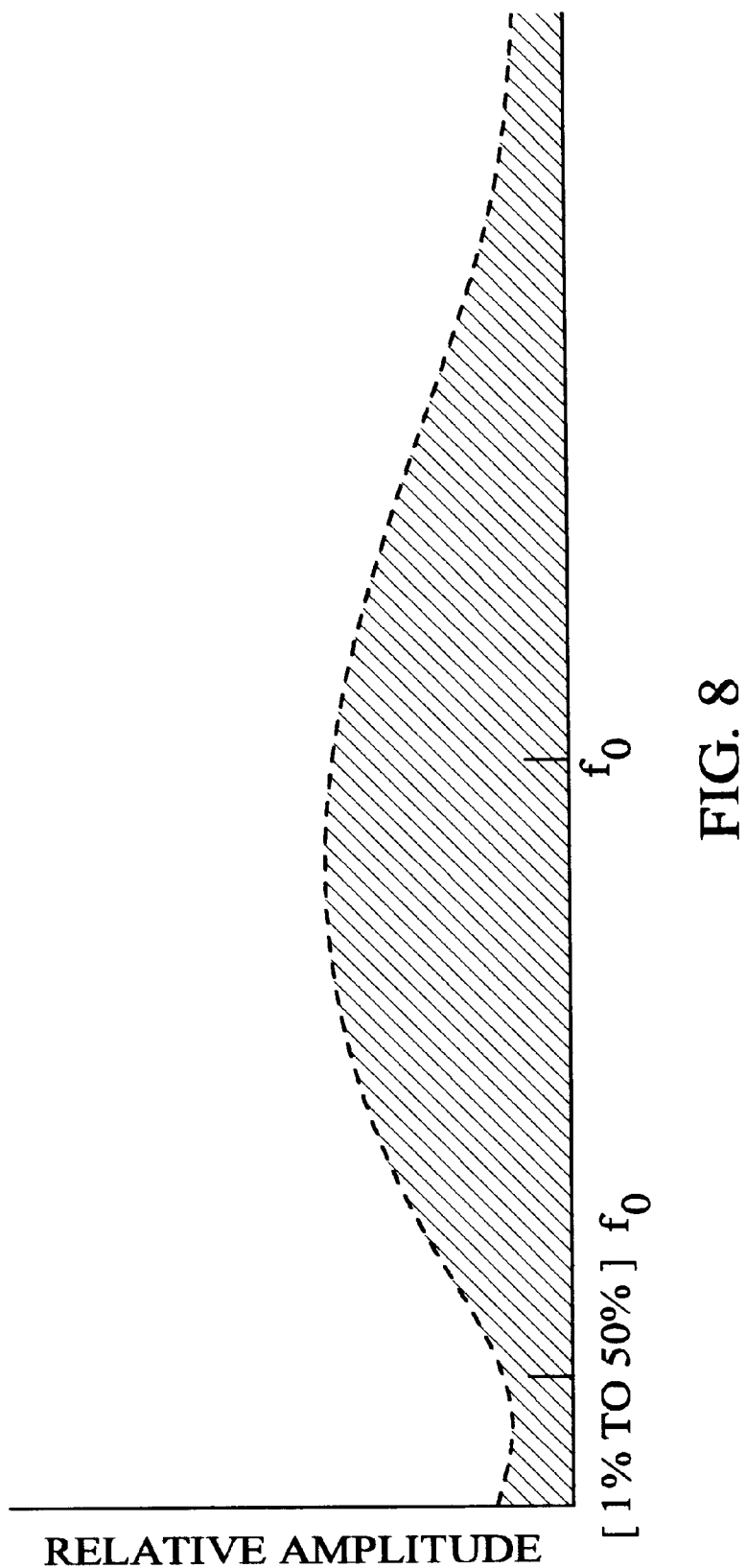
FIG. 8 is a graph showing a broad power spectrum with a complete absence of a power line.

FIG. 7 shows an oscillator circuit whereby c-w may be eliminated. By the use of this oscillator circuit, the possibility and need for coherency in the transmitted radio frequency is eliminated, and allows the oscillator tube 130 to be operated at its rated peak power, minimizing tube microphonics and operating with absolute range cutoff. Antenna 132 consists of a three-gap loop. The three sections are coupled by capacitors 134 and 136 and the antenna is connected across the plate and grid of oscillator tube 130. Pulse modulator 138 comprises a transformer 140 with a primary winding and secondary windings 144 and 146. The output of secondary winding 144 is fed to the grid of tube 130 through isolating diode 148 and r-f choke 150. The output of secondary winding 146 is fed to the plate of tube 130 through r-f choke 152. Referring in addition to FIG. 7A, a pulse with a time voltage characteristic as shown by waveform A is applied to input terminal 154 of primary winding 142. In response to the rapid rise rate of the voltage across primary winding 142, a voltage is induced in secondary winding 144 with a time voltage characteristic shown by waveform B. The output pulse at secondary winding 144 is fed to the grid of tube 130 forcing it into a conducting mode and ringing of the loop. The voltage appearing across secondary winding 146 has the same time voltage characteristics as that of waveform A and is fed to the plate of tube 130 to sustain the oscillation of the loop until termination of the pulse across primary winding 142. The doppler signal is detected by means of diode detector network 156 and fed to output terminal 158. The detected signal at output terminal 158 is processed in the same manner as the detected signal out of diode detector 18 of FIG. 3. FIG. 8 shows the broad power spectrum produced by this circuit.

What is claimed is:

1. In a doppler type target detecting device,
    (a) an antenna acting as a radiator and receiver of electromagnetic energy,
    (b) a radio frequency oscillator normally being in a low level continuous state of oscillation coupled to said antenna,
    (c) a diode detector coupled to said antenna,
    (d) power supply means,
    (e) electronic gating means connected in series with said power supply means and said oscillator for periodically causing said oscillator to change from a low level output at a first frequency to a high level output at a second frequency,
    (f) frequency selective amplifier means coupled to said diode detector and being responsive to a predetermined doppler frequency detected during the reception of reflected signals of the high level output and second frequency.

2. The target detecting device of claim 1 wherein said electronic gating means is a pulsing oscillator.

3. The target detecting device of claim 2 wherein said normally low level operating oscillator includes a triode tube having a grid, anode and cathode.

4. The target detecting device of claim 3 wherein a resistor is connected in series between the output of said pulsing oscillator and the anode of said triode tube for holding said anode voltage to a relatively low value during the non-pulsing periods.

5. In a doppler type target detecting device,
    (a) an antenna acting as a radiator and receiver of electromagnetic energy,
    (b) a radio frequency oscillator having a quiescent state of operation and an oscillating state of operation with said antenna being the tank circuit,
    (c) a diode detector coupled to said antenna,
    (d) a pulse forming network coupled to said radio frequency oscillator and providing a starting pulse to cause said oscillator to begin oscillating and a sustaining pulse to cause said oscillator to oscillate for the desired time of oscillation,
    (e) frequency selective amplifier means coupled to said diode detector and being responsive to a predetermined doppler frequency detected during the reception of reflected signals.

6. The target detecting device of claim 5 wherein said radio frequency oscillator includes a triode tube having a grid, anode and cathode.

7. The target detecting device of claim 6 wherein said pulse forming network includes a transformer having first secondary winding coupled to the grid of said triode tube for providing said starting pulse and a second secondary winding coupled to the anode of said triode tube for providing the sustaining pulse.

8. The target detecting device of claim 5 wherein said antenna is a three gap loop.

\* \* \* \* \*